(Model.)

W. P. HENNION.
SPRING BED BOTTOM.

No. 267,889. Patented Nov. 21, 1882.

Witnesses.
William Young
M. J. Saulpaugh

Inventor.
Wm. P. Hennion

UNITED STATES PATENT OFFICE.

WILLIAM P. HENNION, OF BROOKLYN, NEW YORK, ASSIGNOR TO CORNELIA B. HENNION, OF SAME PLACE.

SPRING BED-BOTTOM.

SPECIFICATION forming part of Letters Patent No. 267,889, dated November 21, 1882.

Application filed March 27, 1882. (Model.)

*To all whom it may concern:*

Be it known that I, WILLIAM P. HENNION, of the city of Brooklyn, in the county of Kings and State of New York, have invented a new and useful Improvement in Spring Bed-Bottoms, which improvement is fully set forth in the following specification, reference being had to the accompanying drawings.

The object of my invention is to make a flexible, elastic, and rolling-up spring bed-bottom that cannot rack or get out of square, as follows: Each bottom slat, $a$, is to be connected to the adjoining slat by two or more pairs of spring tempered steel diagonal cross-braces, $b$, the ends of the braces being firmly riveted to the bottom slats. The centers may be riveted together where they cross each other, as at $c$. There are to be four or more fenders, $d$, of tempered steel. Two or more are to be riveted to each outside bottom slat to hold the bed-bottom in position when in use. All the fenders attached to one of the slats may have a shoulder-rivet, $e$, riveted to each fender, all the fenders on the opposite side to have a button-hole, $f$, in each, for the shoulder-rivet to button into; or the fenders on one side of the bed-bottom may have a hook, $g$, on each, fastened with a rivet, so as to be movable, and a slot, $h$, to receive the staple $i$, which is to be attached to each fender on the opposite side, the hook to hook into the staple when the bed-bottom is rolled up; or each fender on one side of the bed-bottom may have a hook, $j$, on the end to hook into the button-hole or slot of the fender opposite. The slats are provided with a suitable number of inverted conical springs, $x$, placed so that the springs and spaces between the springs on the adjoining slats alternate. The springs are connected together by chains. All the shoulder-rivets and button-holes, the hooks, slots, and staples are for the purpose of holding the bed-bottom firmly together when rolled up for transportation, &c.

Figure 1:
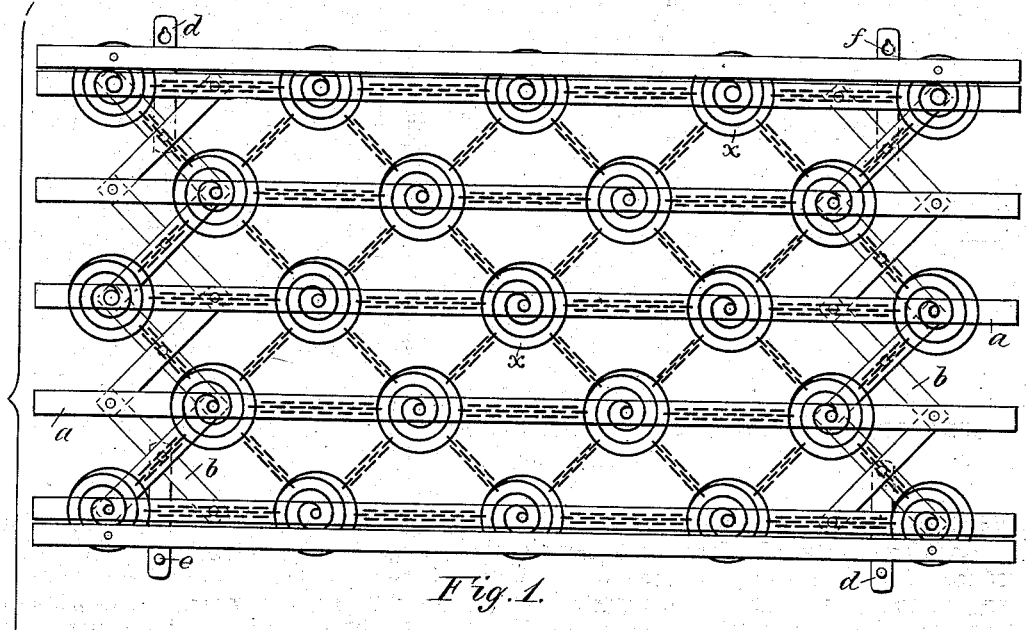
Figure 2:
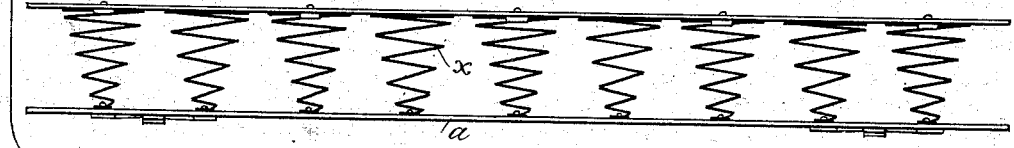
Figure 3:
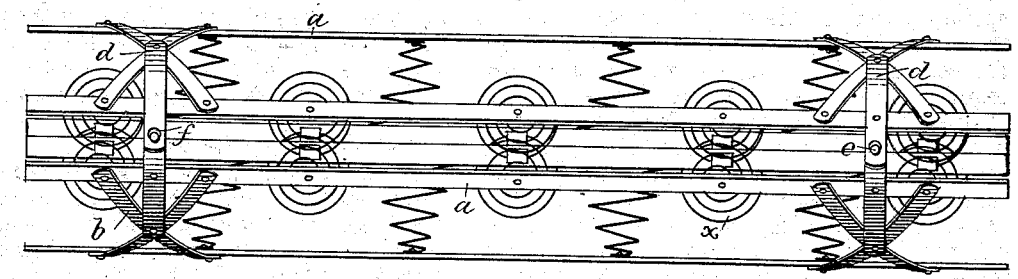
Figure 4:
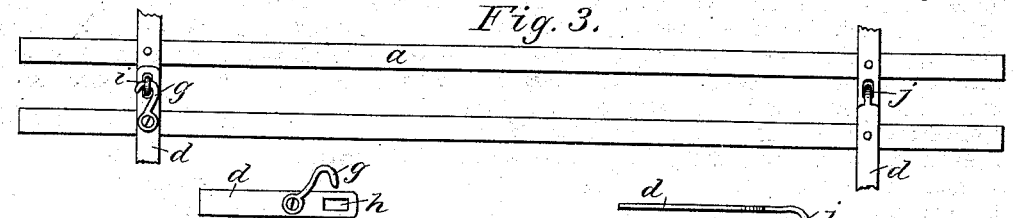
Figure 5:
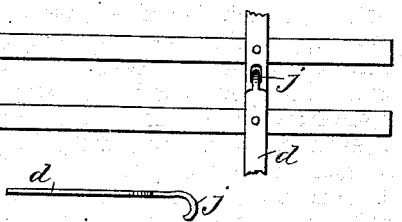
Figure 6:
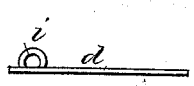

Figure 1 shows a bed-bottom with the springs and all the parts complete. Fig. 2 shows a spring bed-bottom rolled up. Fig. 3 shows two slats connected by fenders with hooks $g$ and $j$ and staples $i$. Fig. 4 shows a fender with hook $g$ and slot $h$. Fig. 5 shows a fender with hook $j$ on end. Fig. 6 shows a staple $i$ on a fender.

I claim as my invention—

A firmly-braced, flexible, elastic, and rolling-up spring bed-bottom, consisting in the combination of the series of slats $a$, connected together by means of diagonal steel braces $b$, arranged as shown and described, with fenders $d$, having studs and holders $e$ $f$, or their described equivalents, with the springs $x$, substantially as and for the purpose specified.

WM. P. HENNION.

Witnesses:
ABRAM T. BUCKHOUT,
JOHN A. SEAMAN,
I. E. STUCKEY.